(12) United States Patent
Kawasaki

(10) Patent No.: US 11,385,848 B2
(45) Date of Patent: Jul. 12, 2022

(54) INFORMATION PROCESSING APPARATUS AND CONTROL METHOD

(71) Applicant: CANON KABUSHIKI KAISHA, Tokyo (JP)

(72) Inventor: Nobuo Kawasaki, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/143,211

(22) Filed: Jan. 7, 2021

(65) Prior Publication Data
US 2021/0240406 A1   Aug. 5, 2021

(30) Foreign Application Priority Data
Jan. 31, 2020   (JP) .............................. JP2020-014841

(51) Int. Cl.
*G06F 3/12*   (2006.01)
(52) U.S. Cl.
CPC ............ *G06F 3/126* (2013.01); *G06F 3/1204* (2013.01); *G06F 3/1257* (2013.01); *G06F 3/1288* (2013.01)
(58) Field of Classification Search
None
See application file for complete search history.

(56) References Cited

U.S. PATENT DOCUMENTS

| | | | |
|---|---|---|---|
| 8,922,795 B2 | 12/2014 | Miller et al. | |
| 2007/0146778 A1* | 6/2007 | Kitagata | G06F 3/1204 358/1.15 |
| 2010/0332699 A1* | 12/2010 | Genda | G06F 13/385 710/63 |
| 2013/0201504 A1* | 8/2013 | Miller | G06F 3/1228 358/1.13 |
| 2014/0173578 A1* | 6/2014 | Ku | G06F 8/65 717/169 |

FOREIGN PATENT DOCUMENTS

WO   2013/116704 A1   8/2013

* cited by examiner

*Primary Examiner* — Frantz Bataille
(74) *Attorney, Agent, or Firm* — Venable LLP

(57) ABSTRACT

A control method using print control software operable in an information processing apparatus capable of communicating with a printer and capable of storing registration information on the printer in a predetermined storage area includes causing a computer of the information processing apparatus to execute obtaining, after an operating system (OS) on the information processing apparatus is updated to a second version capable of using the print control software, with the registration information on the printer stored in the predetermined storage area and being stored during an operation of a first version of the OS on which the print control software is not used, displaying printer information based on the obtained registration information, and registering a print queue with the print control software using the obtained registration information on a basis that the displayed printer information is selected.

21 Claims, 20 Drawing Sheets

```
601:    # Migrated printers.conf
602:    <Printer A_Company_B_series>
603:    PrinterId 22
604:    UUID urn:uuid:ab3eca80-b4da-3d1f-5379-2a5ba1247cfc
605:    Info  A Company B series
606:    Location OFFICE-A
607:    MakeModel A Company B series
608:    DeviceURI usb://A Company/B series serial=201D22
609:    </Printer>
610:    <Printer A_Company_C_series>
611:    PrinterId 17
612:    UUID urn:uuid:06697759-68dc-3a55-45c7-c1547527df01
613:    Info  A Company C series
614:    Location
615:    MakeModel A Company C series
616:    DeviceURI abcnetwork://A Company/C series TYPE=_abc._tcp.
617:    </Printer>
```

FIG.6

```
701:    <Feature name=" UserSettings" >
702:        <Property name=" PageSize" >
703:            <Value> A4 </Value>
704:        </Property>
705:        <Property name=" Duplex" >
706:            <Value> None </Value>
707:        </Property>
708:    </Feature>
```

FIG.7

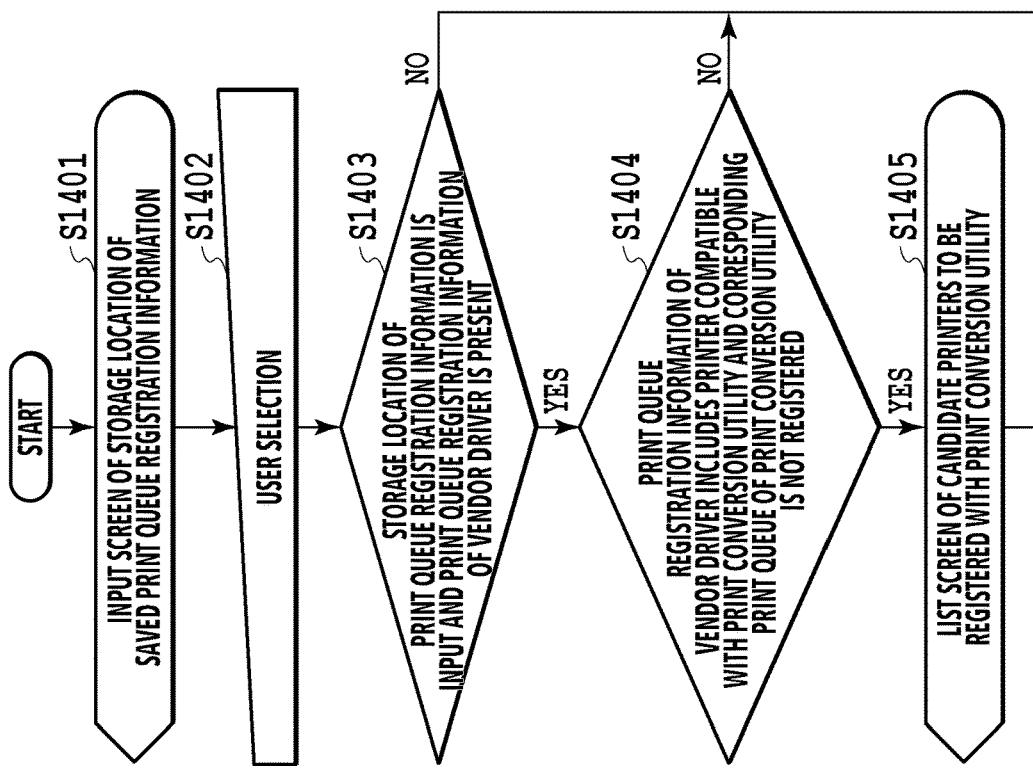

INFORMATION PROCESSING APPARATUS AND CONTROL METHOD

BACKGROUND OF THE INVENTION

Field of the Invention

The present invention relates to an information processing apparatus and a control method.

Description of the Related Art

There is a technique for providing a standard print function (OS standard print function) by an operating system (OS) without the requirement for printer-specific software (specific printer driver) provided by a printer vendor (see International Publication No. WO 2013/116704). The OS determines whether a printer is compatible with (supports) the OS standard print function based on information obtained from the printer, and if so, transmits print data generated by the OS standard print function to the printer.

SUMMARY OF THE INVENTION

However, some printers are not compatible with the OS standard print function and cannot interpret print data generated by the OS standard print function. Further, even if a printer is compatible with the OS standard print function, it is often required that printing be performed based on more advanced print settings than the OS standard print function.

A control method according to an aspect of the present invention is a control method using print control software operable in an information processing apparatus, the control method causing a computer of the information processing apparatus to execute: an obtaining step of obtaining registration information on a print queue of a printer not compatible with OS standard print software from a predetermined storage area in a case where the registration information on the print queue is stored in the storage area; and a registering step of registering the print queue with the print control software using the obtained registration information on the print queue.

Further features of the present invention will become apparent from the following description of exemplary embodiments with reference to the attached drawings.

BRIEF DESCRIPTION OF THE DRAWINGS

FIG. 6 is a diagram showing printer information describing registered printer information;

FIG. 7 is a diagram showing print setting information describing preset print setting information;

FIG. 14 is a diagram showing the relationship of FIGS. 14A and 14B.

FIGS. 14A and 14B are totally a flowchart of first activation processing of the print conversion utility;

DESCRIPTION OF THE EMBODIMENTS

Figure 1:
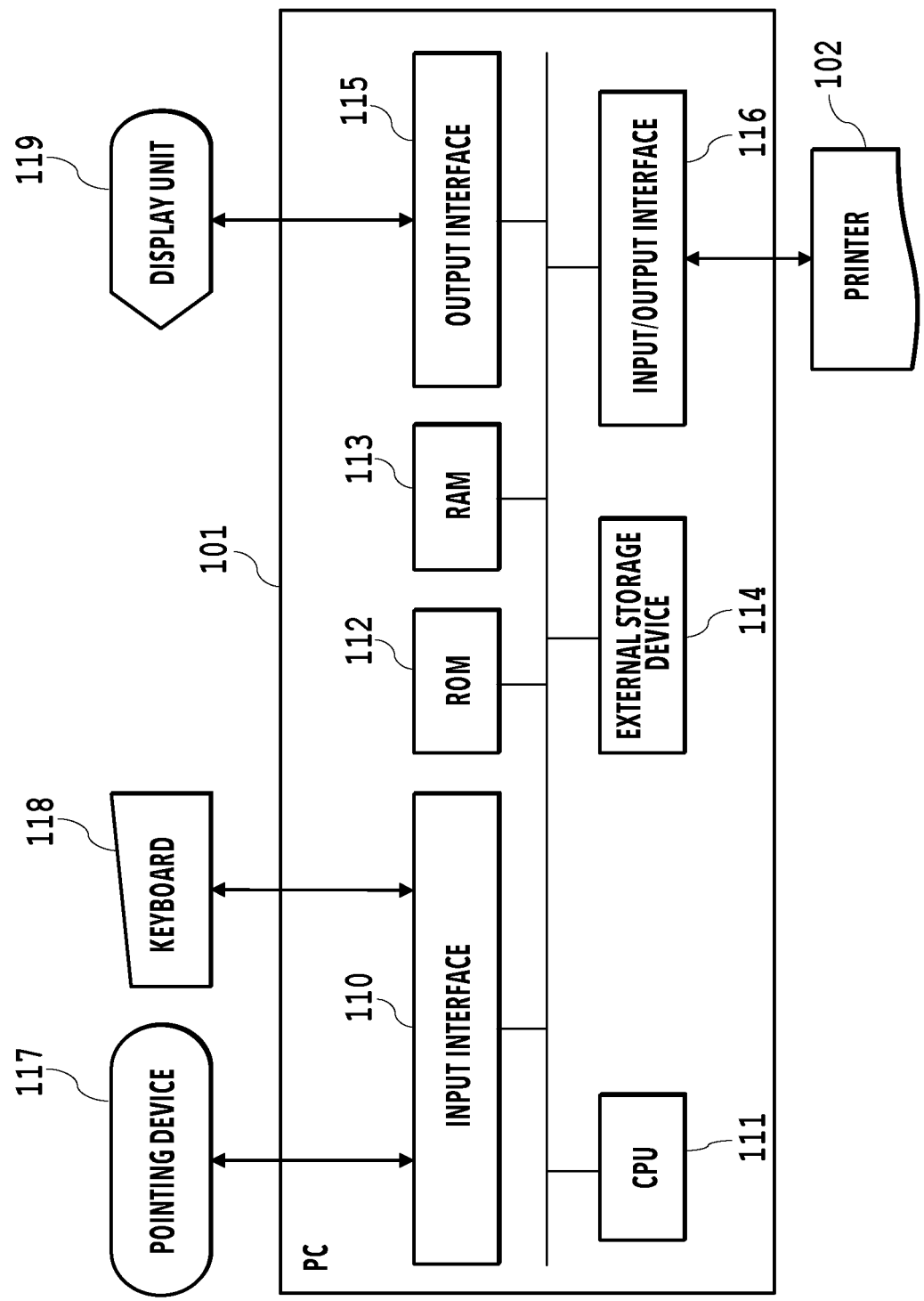
FIG. 1 is a block diagram showing a hardware configuration of a printing system.

Preferred embodiments of the present invention will be hereinafter described in detail with reference to the accompanying drawings. It should be noted that the embodiments described below do not limit the claimed inventions and that not all combinations of features described in the embodiments are essential in solving the problem to be solved by the present invention.

First Embodiment

A printer not compatible with (not supporting) the OS standard print function cannot use the OS standard print function. More specifically, a printer not compatible with the OS standard print function cannot interpret print data in a predetermined format (hereinafter also referred to as "standard format") specified by the OS standard print function. Thus, the present embodiment uses software called print conversion utility, which enables a print instruction using the OS standard print function by making a printer not having the OS standard print function look as if it is compatible with the OS standard print function. The print conversion utility is installed and used on a personal computer (hereinafter referred to as PC) with the OS installed thereon. The print conversion utility may be provided in a computer different from the PC with the OS installed thereon.

In response to an inquiry from the OS about capability information, the print conversion utility informs as a proxy the capability of a printer not compatible with the OS standard print function. The print conversion utility also converts print data (command) in the standard format into print data (command) in a format supported by the printer and transmits the converted data. After the print conversion utility is installed on the PC, the print conversion utility converts communication with a printer according to a printer-specific protocol into communication conforming to the OS standard print function. Thus, even a printer not compatible with the OS standard print function can issue a print instruction from the PC using the OS standard print function. In a case where a specific printer driver provided by a printer vendor is installed on the PC, even a printer not compatible with the OS standard print function can interpret print data as long as it is generated by the specific printer driver. Accordingly, in a case where a user issues a print instruction via a print execution user interface provided by a specific printer driver, printing can be performed without the OS standard print function.

In a case where a user who used a specific printer driver provided by a printer vendor for printing upgrades the OS of the PC, the specific printer driver may become unusable depending on the upgraded OS. For example, there is a possibility that in order to perform printing from a smartphone or tablet or improve the security of the OS, the OS standard print function goes mainstream and the OS system configuration negates the need for the specific printer driver. In a case where the specific printer driver is unstable after the OS upgrade, the print conversion utility is necessary for printing by a printer not compatible with the OS standard print function.

For printing using the print conversion utility, it is necessary to register printer information (also referred to as print queue) used by a user before an OS upgrade with the print conversion utility. In order to register the print queue with the print conversion utility, it is generally required that a printer used by a user before an OS update be connected to a PC and power be applied to the printer. In addition, print setting information registered with the print queue using the specific printer driver needs to be registered again with the print conversion utility. It is assumed that the print queue described in the present embodiment includes at least one of printer information and print setting information. The print queue will be described later in detail.

As described above, it generally takes time and effort for a user to make a preparation for printing using the print conversion utility in a printer not compatible with the OS standard print function after an OS upgrade. A description will be given of a technique to simplify the preparation made by a user for executing printing by means of the print conversion utility for issuing a print instruction using the OS standard print function.

Hardware Configuration of System

FIG. 1 is a block diagram showing a hardware configuration of a system used for printing in the present embodiment. The system has a PC 101 as a host computer and a printer 102. The PC 101 is an example of an information processing apparatus and has an input interface 110, a CPU 111, a ROM 112, a RAM 113, an external storage device 114, an output interface 115, and an input/output interface 116. The input interface 110 is connected to an input device such as a keyboard 118 or a pointing device 117. The output interface 115 is connected to a display device such as a display unit 119.

The ROM 112 stores an initialization program. The external storage device 114 stores an application program group, an operating system (OS), a specific printer driver, and various types of data. The RAM 113 is used as a work memory or the like in the execution of various programs stored in the external storage device 114.

In the present embodiment, the CPU 111 performs processing according to the procedure of a program stored in the ROM 112, thereby implementing functions of the PC 101 to be described later and processing of a flowchart to be described later. The printer 102 as a device is connected to the PC 101 via the input/output interface 116. Although the PC 101 and the printer 102 are separate here, they may be integrated into a single information processing apparatus.

Block Configuration

Figure 2:
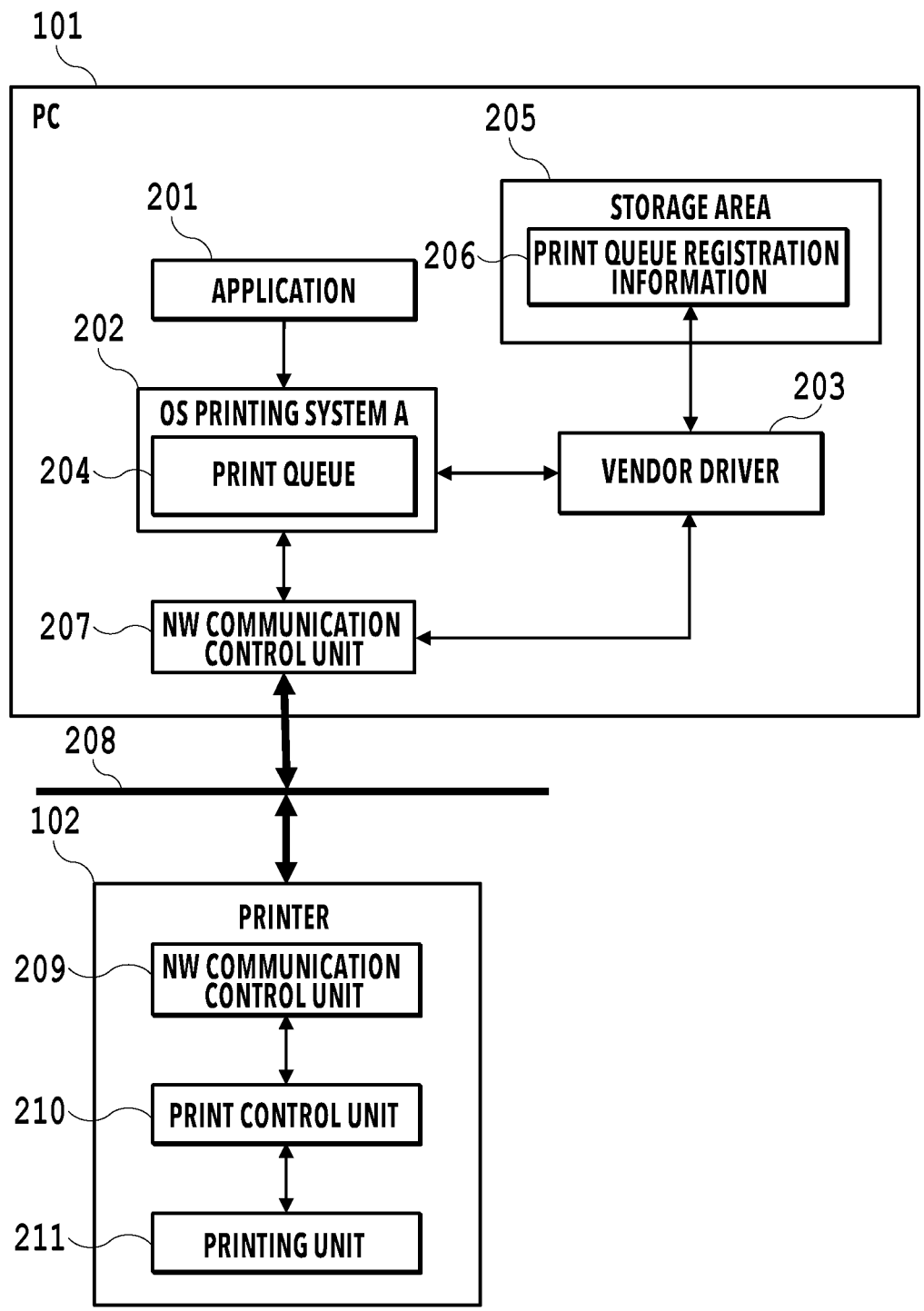
FIG. 2 is a block configuration diagram of the printing system before an OS upgrade.

FIG. 2 is a block configuration diagram illustrating the printing system before an OS upgrade in the PC 101. In the description below, an OS printing system in the first version before the OS upgrade is referred to as an OS printing system A. An OS printing system in the second version after the OS upgrade is referred to as an OS printing system B (described later with reference to FIG. 3).

The PC 101 and the printer 102 are connected to each other via a network 208 and can communicate with each other. Although a local area network (LAN) is assumed as the network in the present embodiment, the network may be a wide area network (WAN). The network connection may be wired and/or wireless. The PC 101 controls the printer 102 connected via the network 208.

The PC 101 has an application 201, an OS printing system A 202, a network (NW) communication control unit 207, a vendor driver 203, and a storage area 205. The OS printing system A 202 has a print queue 204. The vendor driver 203 that is a specific printer driver is for providing the printer 102 with a print instruction. A user installs the vendor driver 203 on the PC 101 and the vendor driver 203 generates the print queue 204 corresponding to the printer 102, whereby the printer 102 can be provided with a print instruction via the OS printing system A 202. In the present embodiment, macOS (Registered Trademark) is assumed as the OS installed on the PC 101.

The print queue is an object for executing printing from the OS or a different application. Each print queue includes a name or the presence/absence of sharing, a connected port or server settings, print settings, device-related settings and the like. The print queue is also used as an object for storing print data.

By generating the print queue 204, print queue registration information 206 of the vendor driver 203 is recorded in the storage area 205. The print queue registration information 206 is information on the print queue 204 registered with the OS printing system A 202 such as various settings of the print queue described above.

The OS printing system A 202 sequentially processes print requests from the application 201 as jobs for each printer connected to the PC 101. The application 201 is software which generates rendered data based on user instructions. The application described here is software operable on the OS. For example, the application 201 is word processing software for document creation, image editing software, and New Year's card creation software. Rendered data generated by a rendering application is in a portable document format (PDF) for example. In a case where a user requests printing of rendered data generated by the application 201, the request is input to the OS printing system A 202 as a print job. Upon receipt of the print job, the OS printing system A 202 generates print data conforming to the function of the printer 102 via the vendor driver 203 and registers the print data with the print queue 204. The print data registered with the print queue 204 is sequentially transmitted to the printer 102 via the vendor driver 203 and the NW communication control unit 207.

The printer 102 has a NW communication control unit 209, a print control unit 210, and a printing unit 211. The print control unit 210 receives print data from the PC 101 via the NW communication control unit 209 and controls the printing unit 211 based on the print data to execute printing.

As described above, in the configuration of FIG. 2, since a print instruction is issued via the specific printer driver, printing can be performed without the OS standard print function.

Figure 3:
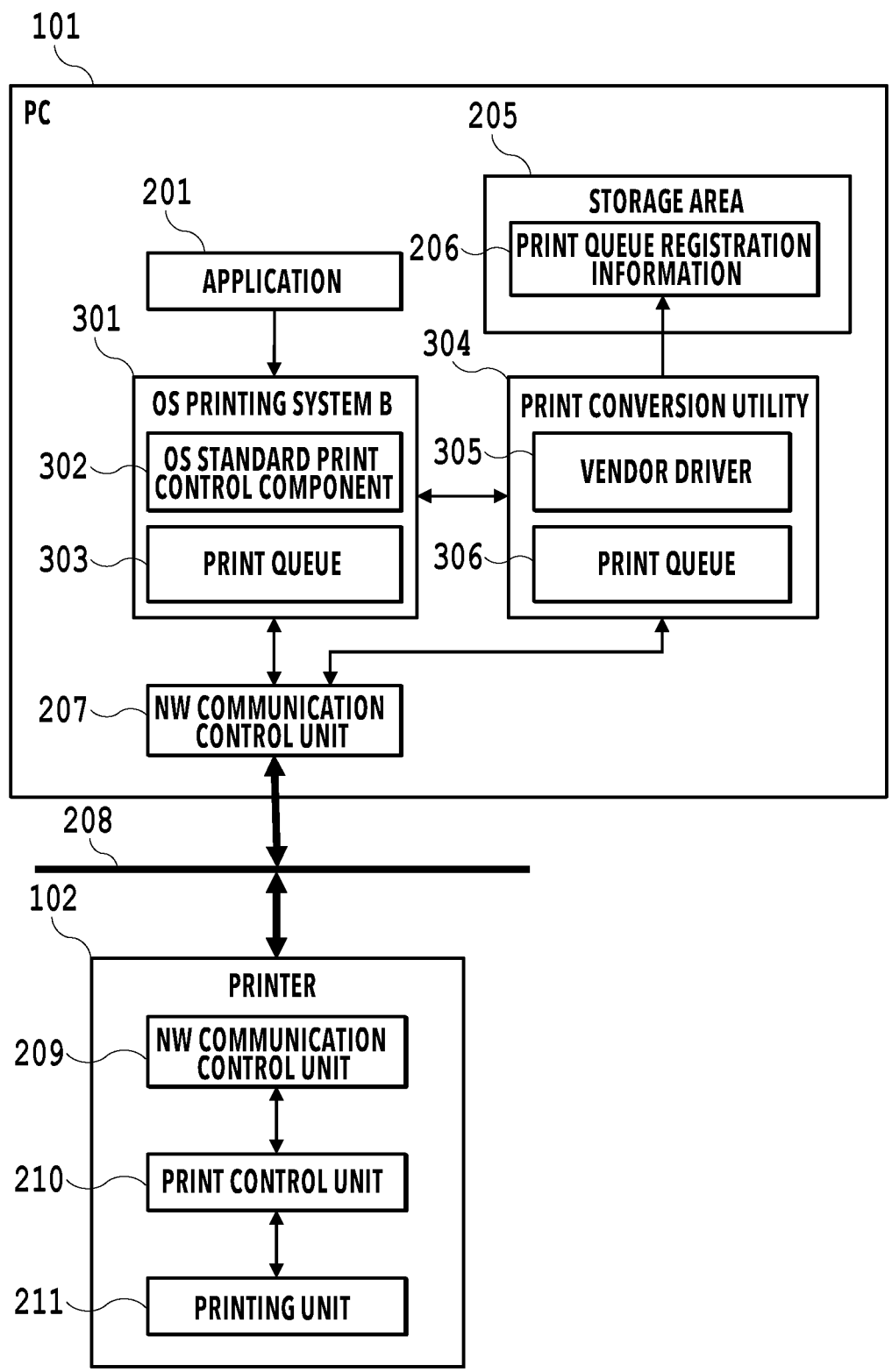
FIG. 3 is a block configuration diagram of the printing system after the OS upgrade.

FIG. 3 is a diagram showing a block configuration of the system after the OS update in the configuration shown in FIG. 2. The PC 101 is identical to the PC 101 of FIG. 2. The PC 101 has an OS printing system B 301 instead of the OS printing system A 202 of FIG. 2. The PC 101 also has a print conversion utility 304. The OS printing system B 301 has an OS standard print control component 302 and a print queue 303. The print conversion utility 304 has a vendor driver 305 and a print queue 306. The print queue registration information 206 recorded in the storage area 205 is identical to that shown in FIG. 2 before the OS upgrade of the PC 101. The rest of the configuration is also identical to that shown in FIG. 2.

The OS printing system B 301 (also referred to as OS standard print software) provides the OS standard print function. Any printer compatible with the OS standard print function can perform printing without the vendor driver.

The print conversion utility 304 including the vendor driver 305 is print control software for using a printer not compatible with the OS standard printing. The print control software is installed on the PC 101 by a user as necessary and thereby made operable on the PC 101. The OS printing system B 301 sequentially processes print requests from the application 201 as jobs for each printer connected to the PC. In a case where a user requests printing of data generated in the application 201, the request is input to the OS printing system B 301 as a print job.

Upon receipt of the print job, the OS printing system B 301 generates print data in the standard format conforming to the OS standard print function. In a case where the print job is for a printer compatible with the OS standard print function, the OS printing system B 301 transmits the generated print data to the printer 102 via the NW communication control unit 207. In contrast, in a case where the print job is for a printer not compatible with (not supporting) the OS standard print function, the OS printing system B 301 transmits print data in the standard format to the print conversion utility 304. The print conversion utility 304 converts the print data in the standard format into print data in a vendor-specific format and transmits the converted print data to the printer 102 via the NW communication control unit 207. The print conversion utility 304 has the function of a virtual printer compatible with the OS standard print function. Thus, the OS printing system B 301 performs processing of outputting the print job for a printer not compatible with the OS standard print function to the virtual printer. In response, the print conversion utility 304 converts print data into the vendor-specific format using the vendor driver 305. The function of the vendor driver 305 is not necessarily identical to that of the vendor driver 203 in the OS printing system A 202 before the OS upgrade. The vendor driver 305 only needs to have at least a function of converting print data into the printer vendor-specific format.

The print conversion utility 304 may be used even in a case where a printer supports the OS printing system B 301 (that is, in a case where a printer can interpret print data in the standard format). More specifically, the print conversion utility 304 may be used for any print instruction for a printer compatible with the print conversion utility 304 even in a case where the printer supports the OS printing system B 301. More functions can be provided by the use of the print conversion utility. For example, the OS standard function provided by the OS printing system B 301 is not compatible with advanced print quality settings such as color matching processing and color or brightness adjustments. In short, there is a limit to the OS standard print function. The use of the print conversion utility 304 makes it possible to provide the same functions as the printer vendor-specific printer driver.

In order to use the print conversion utility 304 from the application 201, it is necessary to register two print queues: the print queue 303 in the OS printing system B 301 and the print queue 306 in the print conversion utility 304. The print queue 303 in the OS printing system B 301 stores print data of the OS standard print function which has received a print request from the application 201. The print queue 306 in the print conversion utility 304 stores print data that the print conversion utility 304 has received from the print queue 303. In a case where the print conversion utility 304 registers the print queue 306, the print queue 303 of the OS standard print function is also automatically registered.

The printer 102 of the present embodiment is not compatible with the OS standard print function. As described above, the print queue 306 is necessary in a case where a user performs printing via the print conversion utility 304 in the application 201 of the PC 101. Without the technique of the present embodiment, it takes time and effort for a user to make a preparation for generation of the print queue 306. This will be specifically described below.

Figure 4:
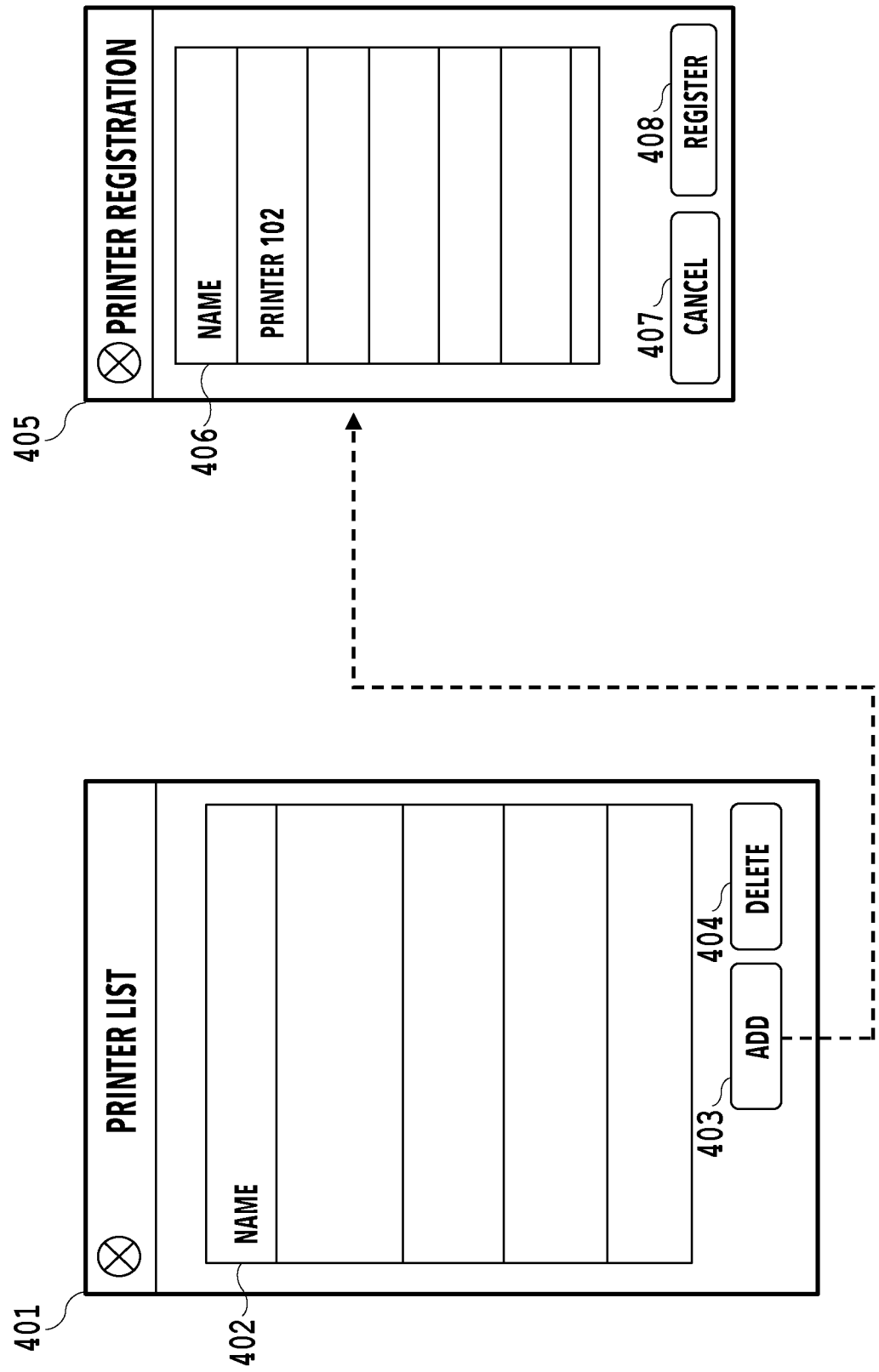
FIG. 4 is a diagram showing a printer list screen of a print conversion utility.

FIG. 4 is a diagram showing an example of a printer list screen 401 displayed by the print conversion utility 304. The printer list screen 401 includes an "add" button 403 for registering a printer and a "delete" button 404 for deleting a printer. In a case where a press of the "add" button 403 is detected, the print conversion utility 304 displays a printer registration screen 405 of FIG. 4.

The printer registration screen 405 includes a printer list 406, a "cancel" button 407, and a "register" button 408. The print conversion utility 304 displays, in the printer list 406, all printers that are connected to the PC 101 via the network or USB, have power applied thereto, and are not compatible with the OS standard function. In other words, a printer not connected to the PC 101 via the network or USB or not having power applied thereto is not displayed in the printer list 406 and cannot be registered. Therefore, a user who has upgraded the OS needs to power on a printer to be registered and connect the printer via the network or USB as a preparation.

In a case where it is detected that a user presses the "register" button 408 while a printer in the printer list 406 is selected, the print conversion utility 304 generates a print queue 306 corresponding to the selected printer.

The present embodiment will show an example in which the print conversion utility 304 automatically generates the print queue 306 based on the premise that the print queue registration information 206 is present in the storage area 205 after an OS update of the PC 101. In other words, in this example, the print conversion utility 304 generates the print queue 306 even in a case where a printer is not connected to the PC 101 via the network or USB or does not have power applied thereto.

Figure 5:
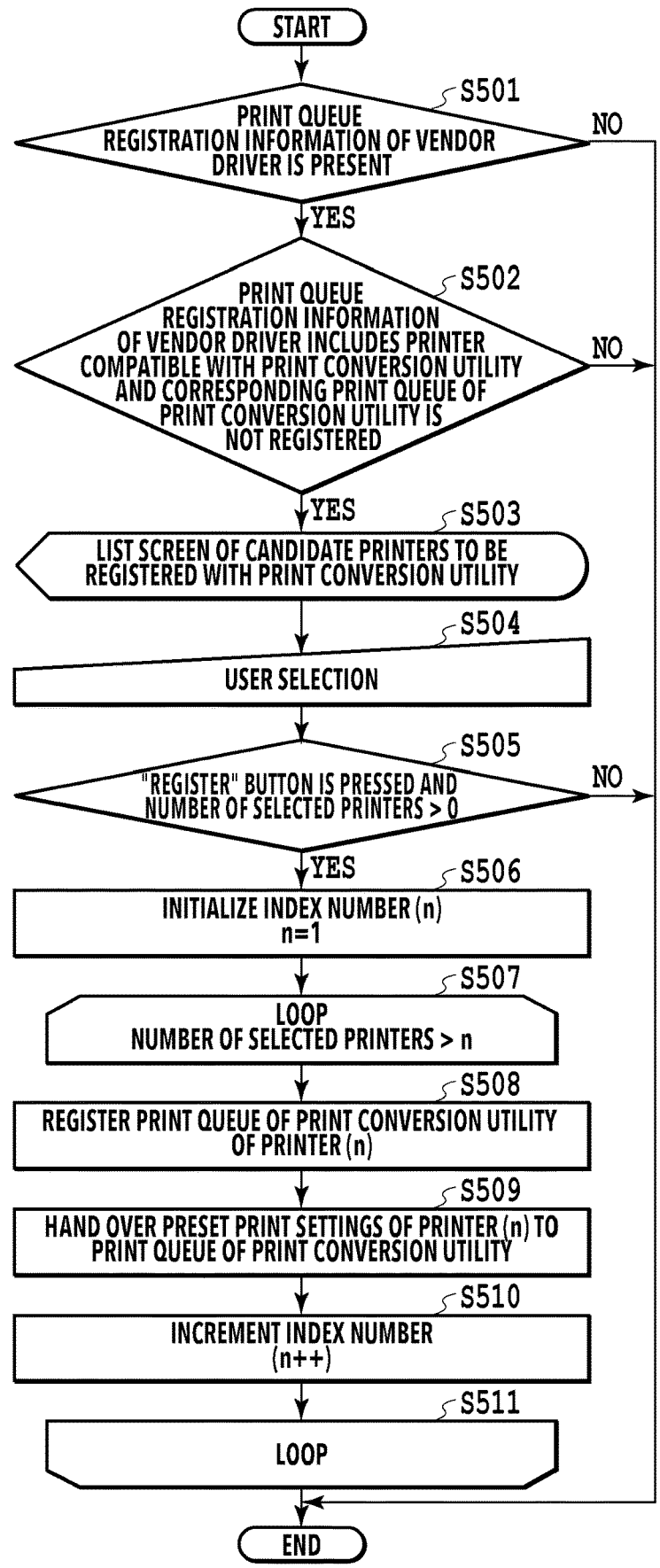
FIG. 5 is a flowchart of first activation processing of the print conversion utility.

FIG. 5 is a flowchart of processing performed by the print conversion utility 304 at the first activation in the present embodiment. The processing shown in FIG. 5 is performed by the CPU 111 executing the program of the print conversion utility 304 stored in the ROM 112 or the external storage device 114. In the description of the processing, "S" indicates a step in the flowchart (the same applies hereinafter).

The print conversion utility 304 starts the activation processing of FIG. 5 only at the first activation. In S501, the print conversion utility 304 determines whether the print queue registration information 206 of the vendor driver 203 is present in the storage area 205 of the PC 101.

The print queue registration information 206 includes printer information and preset print setting information. In the case of network connection, for example, the printer information includes TXT record information including a Multicast DNS or DNS-SD hostname of the printer and accompanying printer model information. That is, the printer information includes an IP address of the printer or information from which the IP address is derivable. In the case of USB connection, for example, the printer information includes a USB serial number of the printer as a USB device and printer model information. The preset print setting information indicates information on print setting values arbitrarily selected by a user. A specific example will be described below.

FIG. 6 is a diagram showing an example of the printer information describing registered printer information. The printer information is described in a markup language. In FIG. 6, lines 602 to 609 are printer information registered by USB connection. The description following "serial=" in line 608 indicates a USB serial number. The description following "MakeModel" in line 607 indicates printer model information.

In FIG. 6, lines 610 to 617 are printer information registered by network connection. The description following "DeviceURI" in line 616 indicates a Multicast DNS hostname. The description following "MakeModel" in line 615 indicates printer model information.

FIG. 7 is a diagram showing an example of a file describing preset print setting information. The file of FIG. 7 is described in a markup language and interpreted by a key of each markup. In FIG. 7, lines 701 and 708 indicate that print settings are described between these lines. Lines 702 to 704 describe a sheet size setting and indicate that the setting value is "A4." Lines 705 to 707 describe a duplex setting and indicate that the setting value is "None."

If the print conversion utility 304 determines in S501 that the print queue registration information 206 of the vendor driver is not present, the processing is finished. If the print conversion utility 304 determines in S501 that the print queue registration information 206 of the vendor driver is present, the print conversion utility 304 proceeds to S502.

In S502, the print conversion utility 304 determines whether the information whose presence is confirmed in S501 includes information on a printer compatible with the print conversion utility 304. The print conversion utility 304 further determines whether a print queue of the print conversion utility 304 corresponding to that printer is not registered. If the information obtained in S501 includes information on a compatible printer and a print queue of the print conversion utility 304 corresponding to that printer is not registered (if there is a printer satisfying a condition), the print conversion utility 304 proceeds to S503. If it is determined that there is no printer satisfying the condition, the processing is finished.

In S503, the print conversion utility 304 generates a printer list showing candidates to be registered with the print conversion utility 304 based on the print queue registration information. The print conversion utility 304 displays a printer list screen and proceeds to S504.

Figure 8:
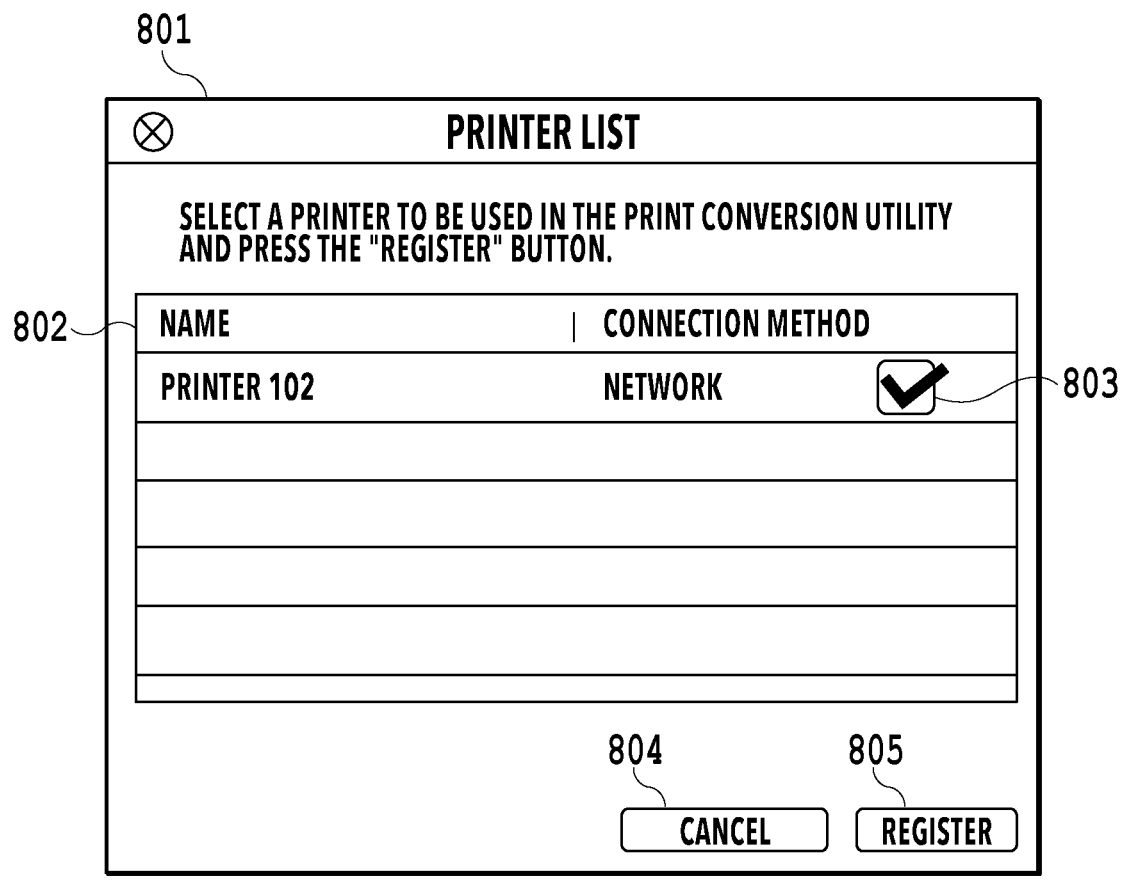
FIG. 8 is a diagram showing a registration candidate printer list screen of a print conversion utility.

FIG. 8 is a diagram showing an example of a printer list screen 801 displayed by the print conversion utility 304 in S503 to show a candidate to be registered with the print conversion utility 304. The printer list screen 801 includes a printer list 802, a checkbox 803, a "cancel" button 804, and a "register" button 805. The printer list 802 displays a list of printers obtained from the print queue registration information.

In S504, a user selects a printer to be registered with the print conversion utility 304 from the printer list 802 using the checkbox 803. That is, the print conversion utility 304 performs accepting processing of accepting designation of a printer to be registered with the print conversion utility 304. If the print conversion utility 304 detects a press of the "cancel" button 804 or the "register" button 805, the print conversion utility 304 proceeds to S505.

In S505, the print conversion utility 304 determines whether a user presses the "register" button 805 and selects one or more printers. If the condition is satisfied, the print conversion utility 304 proceeds to S506. In other cases, the print conversion utility 304 finishes the processing.

In S506, the print conversion utility 304 initializes an index number (n=1) and proceeds to S507. In S507, the print conversion utility 304 starts a loop which is repeated a number of times equal to the number of selected printers. In S508, the print conversion utility 304 obtains printer information from print queue registration information 206 of a vendor driver of the n-th printer and registers (generates) a print queue 306 of the print conversion utility. After that, the print conversion utility 304 proceeds to S509.

In S509, the print conversion utility 304 obtains preset print setting information from the print queue registration information 206 of the vendor driver of the n-th printer and hands over the information to the print queue 306 of the print conversion utility 304. The print settings handed over in S509 are usable in a print execution user interface provided by the print conversion utility 304. In S510, the print conversion utility 304 increments the index number, proceeds to S511, and repeats the loop.

As described above, in a case where the print queue 306 of the print conversion utility 304 is registered, the print queue 303 of the OS printing system B 301 is also automatically registered. That is, in a case where the print conversion utility 304 registers a printer with itself, the print conversion utility 304 adds internally generated information about compatibility with the OS standard print function to information about the registered printer and responds to the OS printing system B 301. The information about the printer includes a model name, a printer name, and printer installation location information for example. The internally generated information about compatibility with the OS standard print function includes an UUID and capability information for example. The print conversion utility 304 executes a registration command to register the print queue 303 of the printer 102 with the OS printing system B 301 based on information about a printer (printer 102) for which the print conversion utility 304 acts as a proxy to respond to the OS printing system B 301. The information about a printer for which the print conversion utility 304 acts as a proxy to respond to the OS printing system B 301 is a model name, a printer name, printer installation location information, a UUID, or capability information for example. In this manner, the print conversion utility 304 instructs the OS printing system B 301 to register the print queue 303. A user only executes the processing for registering the print queue with the print conversion utility 304, whereby the print queue 303 of the OS printing system 301B is also automatically registered.

As described, in the present embodiment, a print instruction can be appropriately output to the printer 102 by means of the OS standard print function by using the print conversion utility 304. In addition, in a case where print queue information based on which printing was executed via the vendor driver before an OS upgrade of the PC 101 is present after the OS upgrade of the PC, the print conversion utility 304 informs a user of the printer list. The print conversion utility 304 allows a user to select a printer to be registered with the print conversion utility, thereby simplifying print queue registration with the print conversion utility. Further, a user can register the print queue even in a case where a printer used before the OS upgrade is not connected to the PC or does not have power applied thereto. Accordingly, a user can be saved from having to make a preparation for printing in a printer not compatible with the OS standard print function using the print conversion utility after the OS upgrade. A user can also reuse preset print settings registered with the print queue of the vendor driver.

Second Embodiment

In the first embodiment, the print queue 306 is automatically generated based on the premise that the print queue registration information 206 recorded in the storage area 205 is present after the OS upgrade of the PC 101. In the present embodiment, the print queue 306 is automatically generated based on the premise that the print queue registration information 206 recorded in the storage area 205 is not present after the OS upgrade of the PC 101.

Figure 9:
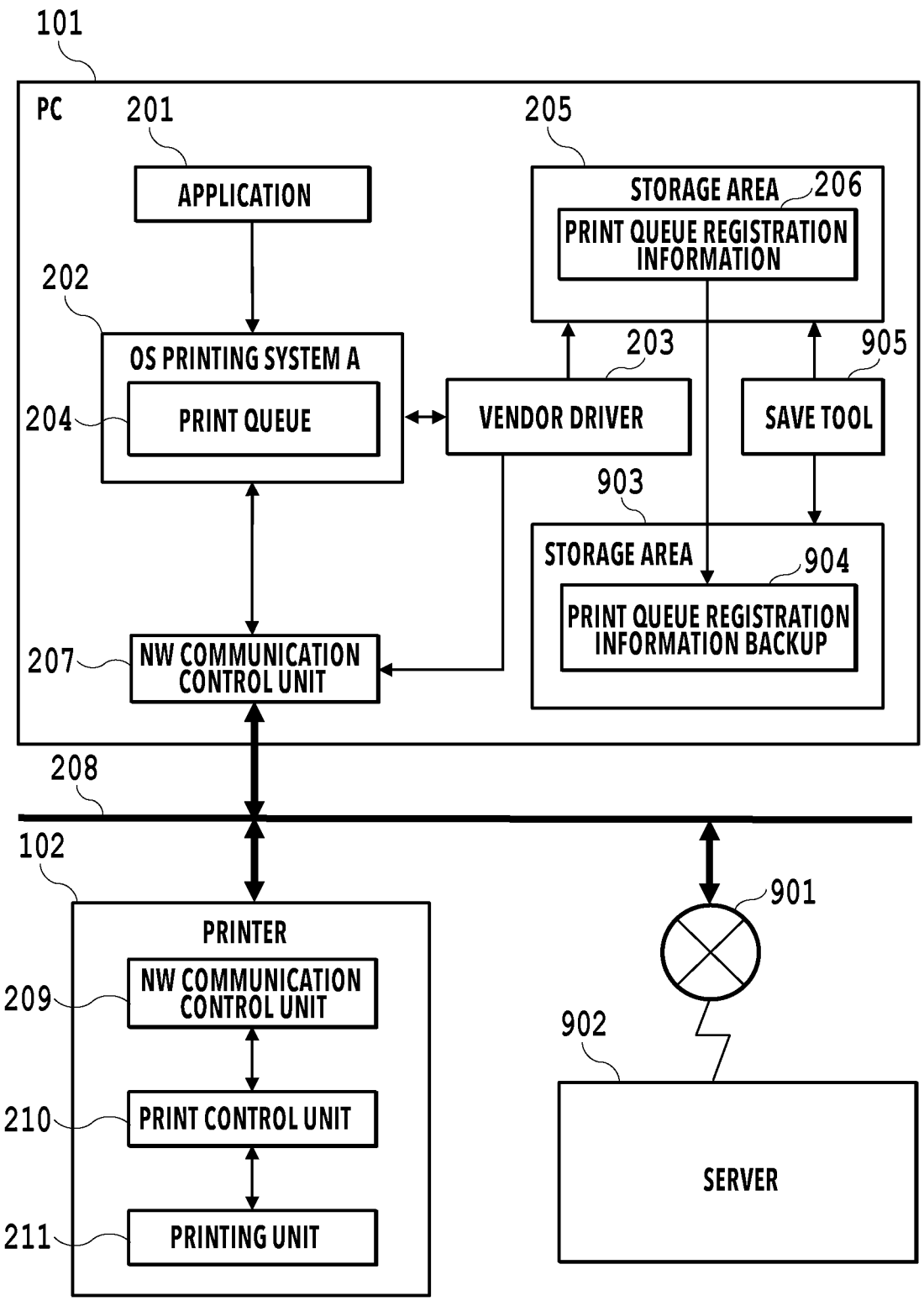
FIG. 9 is a block configuration diagram of the printing system before the OS upgrade.

FIG. 9 is a block diagram showing the system configuration before the OS upgrade of FIG. 2 with the Internet 901 and a server 902 added thereto. The server 902 may be a network server connected to the PC 101 via the network 208 or the Internet 901 or may be a local server connected to the PC 101 only via the network 208. In addition, in FIG. 9, the PC 101 has a save tool 905 (print queue registration information save tool), which is software for saving print queue registration information. Although the print queue registration information 206 is recorded in the storage area 205 before the OS upgrade, the print queue registration information 206 recorded in the storage area 205 is not present after the OS upgrade.

Print Queue Registration Information Save Processing

Figure 10:
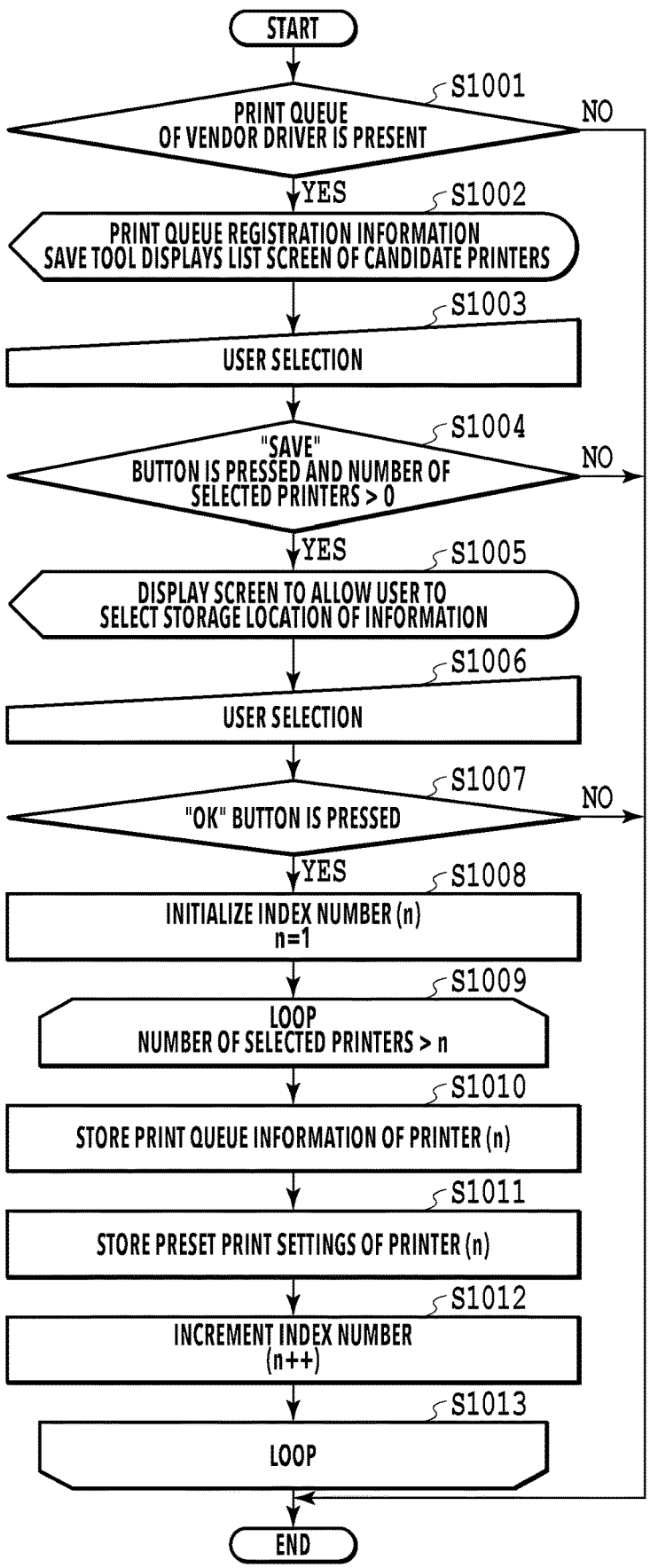
FIG. 10 is a flowchart of a save tool.

FIG. 10 is a flowchart of processing of saving the print queue registration information 206 using the save tool 905 (save software) for saving print queue registration information before the OS upgrade of the PC 101. Although the save tool 905 is installed on the PC 101 in the present embodiment, the server 902 or a different apparatus may have the save tool 905.

If the save tool 905 is activated, the save tool 905 determines in S1001 whether the print queue registration information 206 of the vendor driver is present in the storage area of the PC 101. If the save tool 905 determines in S1001 that the print queue registration information of the vendor driver is not present in the storage area of the PC 101, the processing is finished. If the save tool 905 determines in S1001 that the print queue registration information of the vendor driver is present, the save tool 905 proceeds to S1002.

In S1002, the save tool 905 generates a registered printer list and displays the generated printer list.

Figure 11:
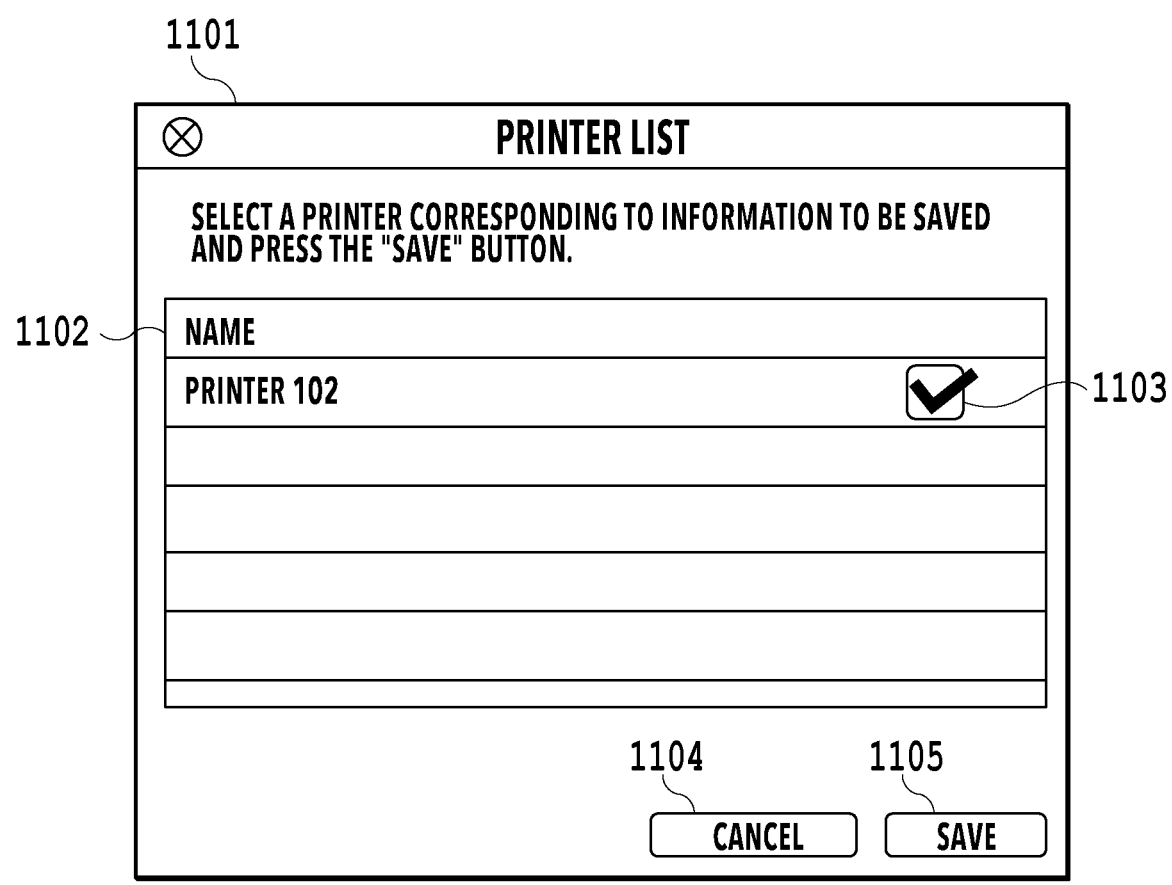
FIG. 11 is a diagram showing a printer list screen of the save tool.

FIG. 11 is a diagram showing an example of a registered printer list screen 1101 displayed by the save tool 905. The printer list screen 1101 has a printer list 1102, a checkbox 1103, a "cancel" button 1104, and a "save" button 1105.

In S1003, a user selects a printer corresponding to print queue registration information 206 to be saved using the checkbox 1103. That is, the save tool 905 accepts the selection of a printer corresponding to print queue registration information 206 to be saved. If a user presses the "save" button 1105 or the "cancel" button 1104, the save tool 905 proceeds to S1004.

In S1004, the save tool 905 determines whether a user presses "save" and selects one or more printers. If the condition is satisfied, the save tool 905 proceeds to S1005. In other cases, the processing is finished.

In S1005, the save tool 905 displays a screen for allowing a user to select a storage location (save location) of the print queue registration information 206.

Figure 12:
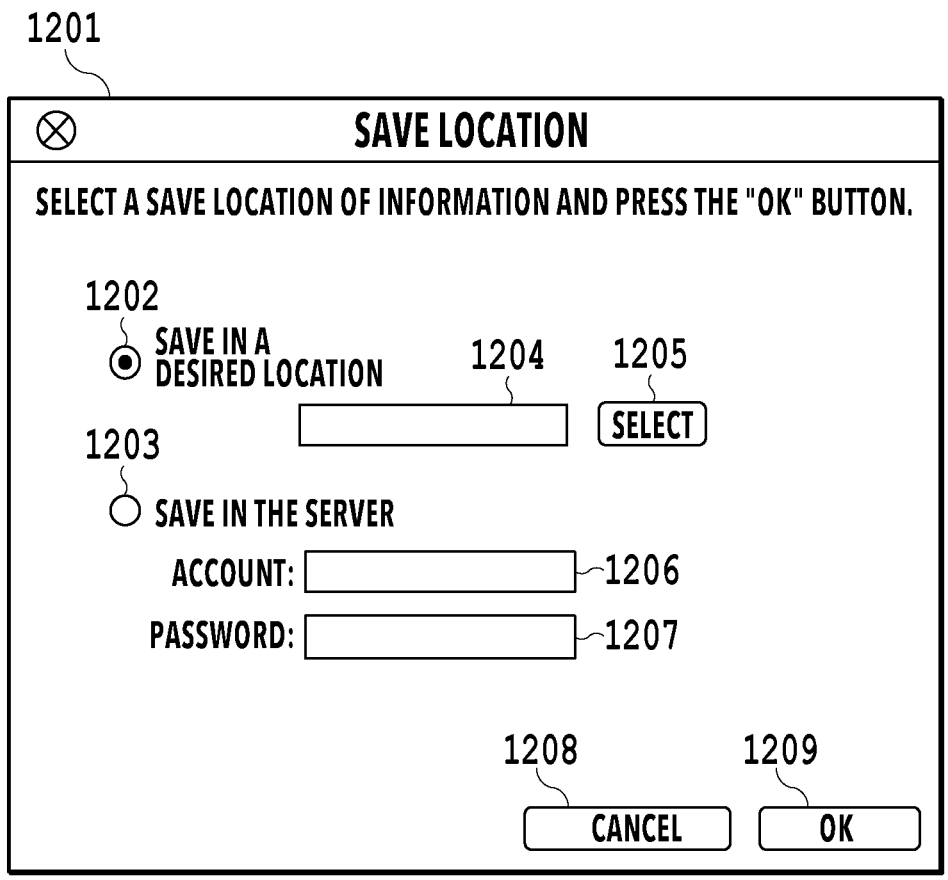
FIG. 12 is a diagram showing a selection screen of the save tool for selecting a storage location of printer information.

FIG. 12 is a diagram showing an example of a selection screen 1201 of the save tool 905 for selecting a storage location of print queue registration information. In S1006, a user selects a storage location of print queue registration information. That is, the save tool 905 accepts the selection of a storage location of print queue registration information. In the case of storing the print queue registration information in a desired location, a user selects a radio button 1202 and inputs a folder path to the storage location to an input box 1204 or opens a file explorer by the "select" button 1205 and selects a file path. The folder path selected by the file explorer is reflected in the input box 1204. The selected folder path corresponds to a storage area 903. In the case of storing the print queue registration information in the server, a user selects a radio button 1203, inputs account information to an input box 1206, and inputs a password to an input box 1207. If a user presses an "OK" button 1209 or a "cancel" button 1208, the save tool 905 proceeds to S1007. If the save tool 905 determines that a user selects "OK" in S1007, the save tool 905 proceeds to S1008. In other cases, the processing is finished.

In S1008, the save tool 905 initializes an index number (n=1). In S1009, the save tool 905 starts a loop which is repeated a number of times equal to the number of selected printers. In S1010, the save tool 905 obtains printer information from print queue registration information 206 of a vendor driver of the n-th printer and stores the printer information in the location selected by a user in S1006 as a print queue registration information backup 904. The printer information is the same as that described in the first embodiment. After that, in S1011, the save tool 905 obtains preset print settings from the print queue registration information 206 of the vendor driver of the n-th printer and stores the settings in the location selected by a user in S1006 as the print queue registration information backup 904. The save tool 905 increments the index number in S1012, proceeds to S1013, and repeats the loop.

Automatic Print Queue Generation Processing of Print Conversion Utility

Figure 13:
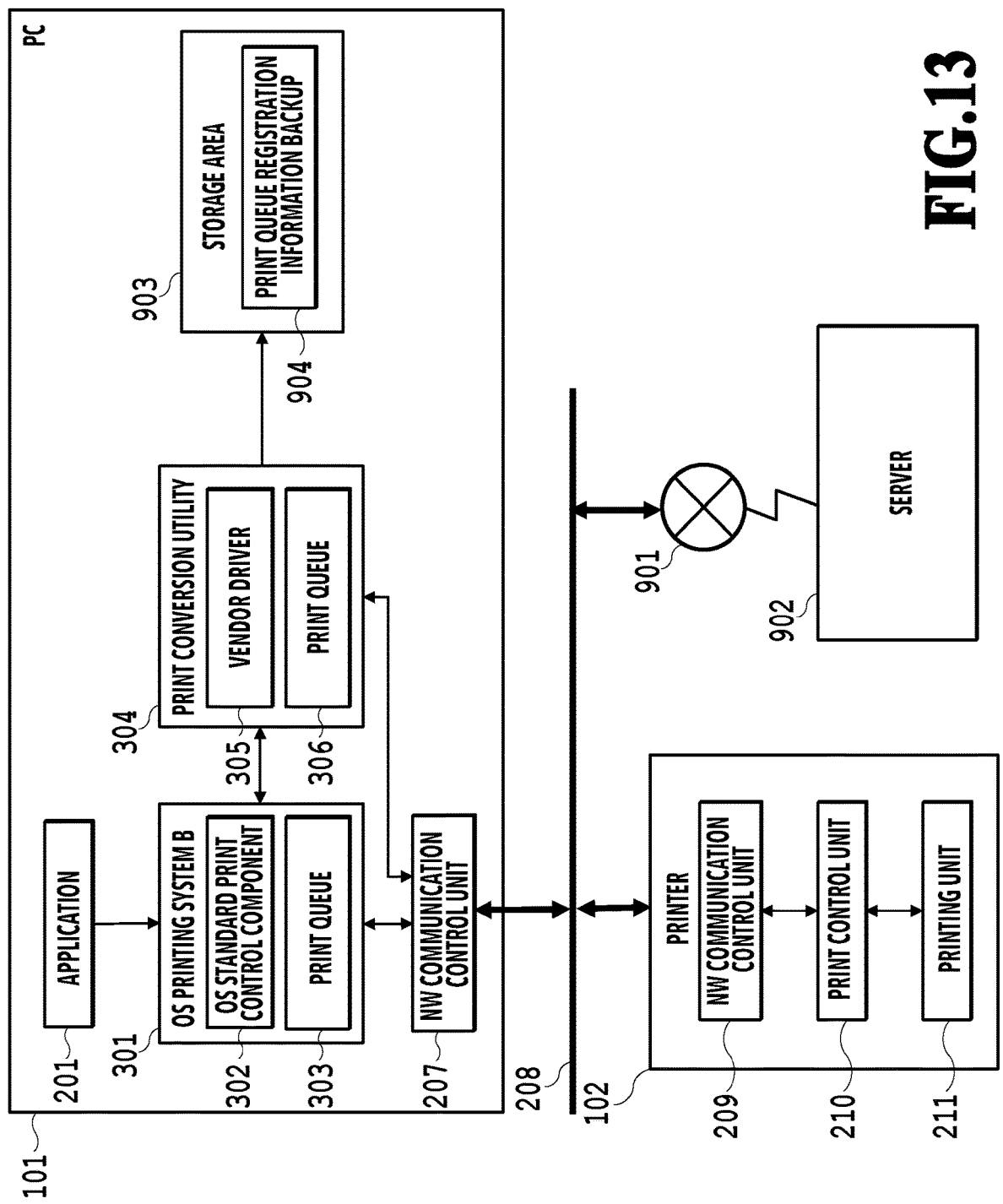
FIG. 13 is a block configuration diagram of the printing system after the OS upgrade.

FIG. 13 is a diagram showing a block configuration of the system after the OS upgrade of the PC 101 in the present embodiment. In FIG. 13, the Internet 901 and the server 902 shown in the system configuration of FIG. 9 are added to the system configuration of FIG. 3. The print queue registration information backup 904 is information stored in the print queue registration information save processing of FIG. 12. The storage area storing the print queue registration information backup 904 is the storage area 903 of the PC 101 in the example of FIG. 13 but may be a storage area of the server 902. Alternatively, the print queue registration information backup 904 may be stored in both of the storage area 903 of the PC 101 and the storage area of the server 902.

Figure 14B:
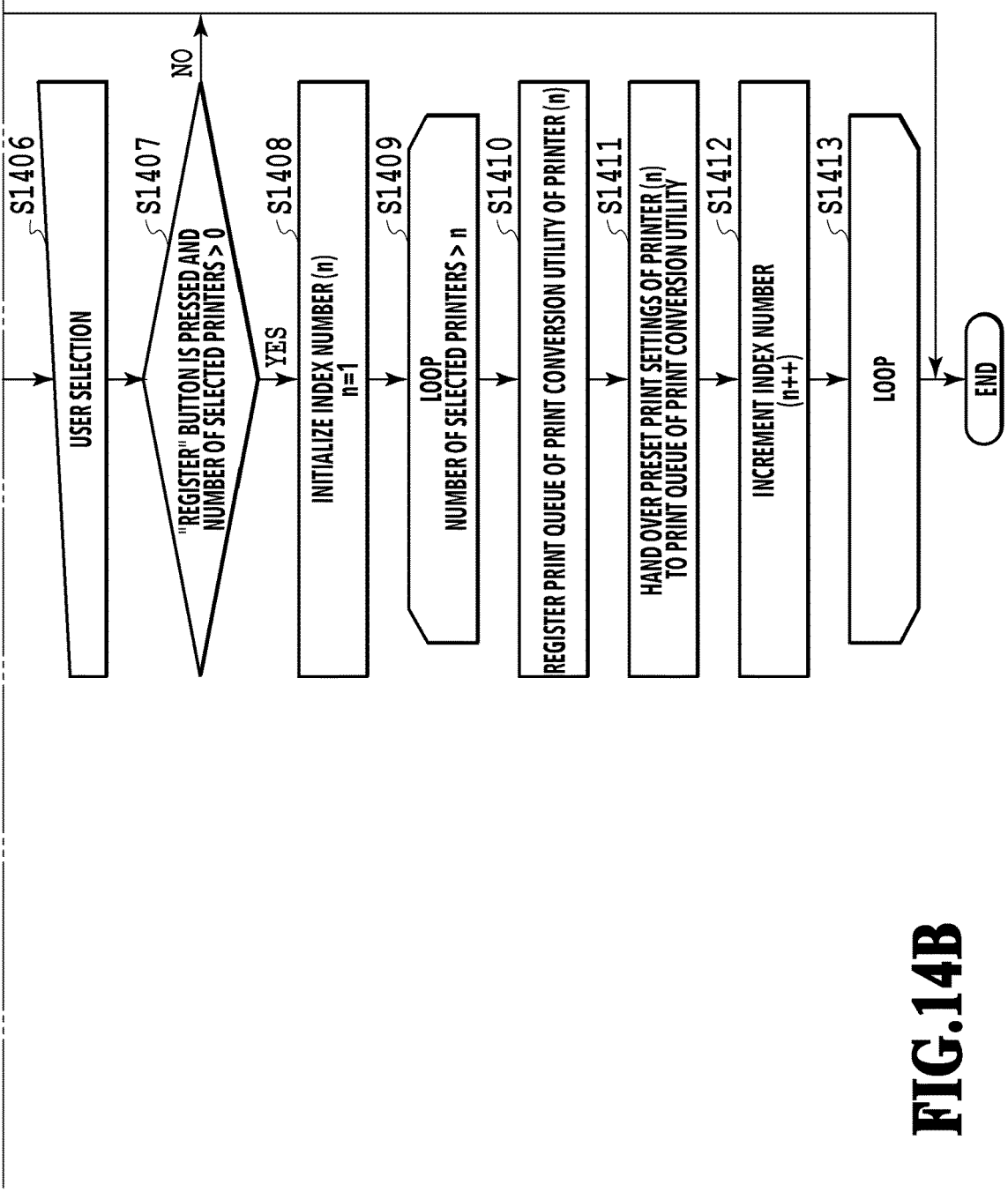

FIGS. 14A and 14B are totally a flowchart of the first activation processing of the print conversion utility 304 in the present embodiment. The print conversion utility 304 starts the activation processing of FIGS. 14A and 14B only at the first activation.

Figure 15:
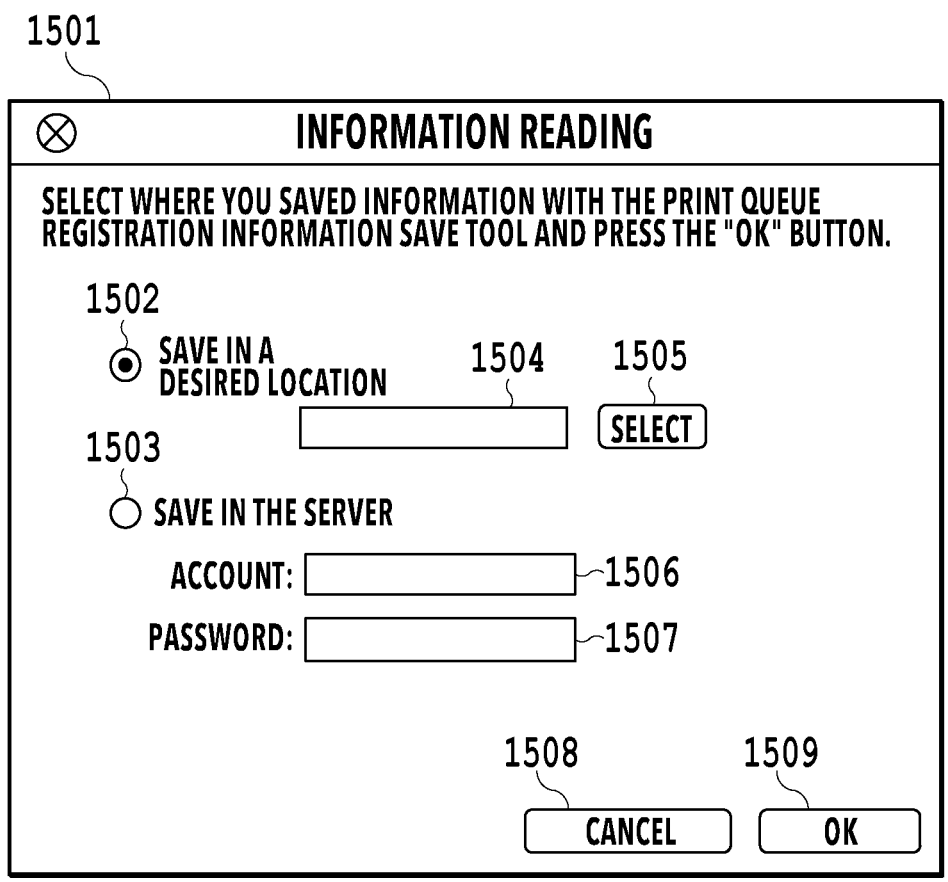
FIG. 15 is a diagram showing a selection screen of the print conversion utility.

In S1401, the print conversion utility 304 displays an input screen of a storage location of the saved print queue registration information. FIG. 15 is a diagram showing an example of an input screen 1501 of a storage location of the saved print queue registration information.

In S1402, a user inputs a storage location of the print queue registration information backup 904 stored (saved) in the print queue registration information save processing. That is, the print conversion utility 304 accepts the input of a storage location of the saved print queue registration information. In a case where the information is stored in a desired location, a user selects a radio button 1502 and directly inputs a folder path to an input box 1504 or presses a "select" button 1505, opens a file explorer, and selects a file path. In a case where the information is stored in the server, a user selects a radio button 1503 and inputs account information to an input box 1506 and a password to an input box 1507. If a user presses an "OK" button 1509, the print conversion utility 304 proceeds to S1403. If a user presses a "cancel" button 1508, the processing is finished.

In S1403, if the print conversion utility 304 determines that a storage location of the print queue registration information is input by a user in S1402 and the print queue registration information is present in that storage location, the print conversion utility 304 proceeds to S1404. In other cases, the processing is finished.

In S1404, the print conversion utility 304 determines whether the print queue registration information whose presence is confirmed in S1403 includes information on a compatible printer and a print queue of the print conversion utility 304 corresponding to that printer is not registered. If there is no printer satisfying the condition, the processing is finished. If there is a printer satisfying the condition, the print conversion utility 304 proceeds to S1405.

In S1405, the print conversion utility 304 generates a registration candidate printer list and displays a printer list screen 801 showing a candidate to be registered with the print conversion utility 304 as shown in FIG. 8. Since S1406 to S1413 are identical to S504 to S511 described with reference to FIG. 5 except for the use of the print queue registration information backup 904 stored in the storage location (storage area) selected by a user, the description thereof is omitted.

As described above, in the present embodiment, print queue information based on which printing was executed via the vendor driver before the OS upgrade of the PC is saved by the save tool 905 before the OS upgrade of the PC. After the OS upgrade of the PC, the print conversion utility informs a user of the printer list. The print conversion utility allows a user to select a printer to be registered with the print conversion utility, thereby simplifying print queue registration with the print conversion utility. Further, a user can register the print queue even in a case where a printer used before the OS upgrade is not connected to the PC or does not have power applied thereto. A user can also reuse preset print settings registered with the print queue of the vendor driver.

Third Embodiment

In the second embodiment, the print queue registration information of the vendor driver is saved using the save tool 905 before the OS upgrade of the PC 101. In the present embodiment, the print queue registration information is saved by not the save tool 905 but the vendor driver.

Figure 16:
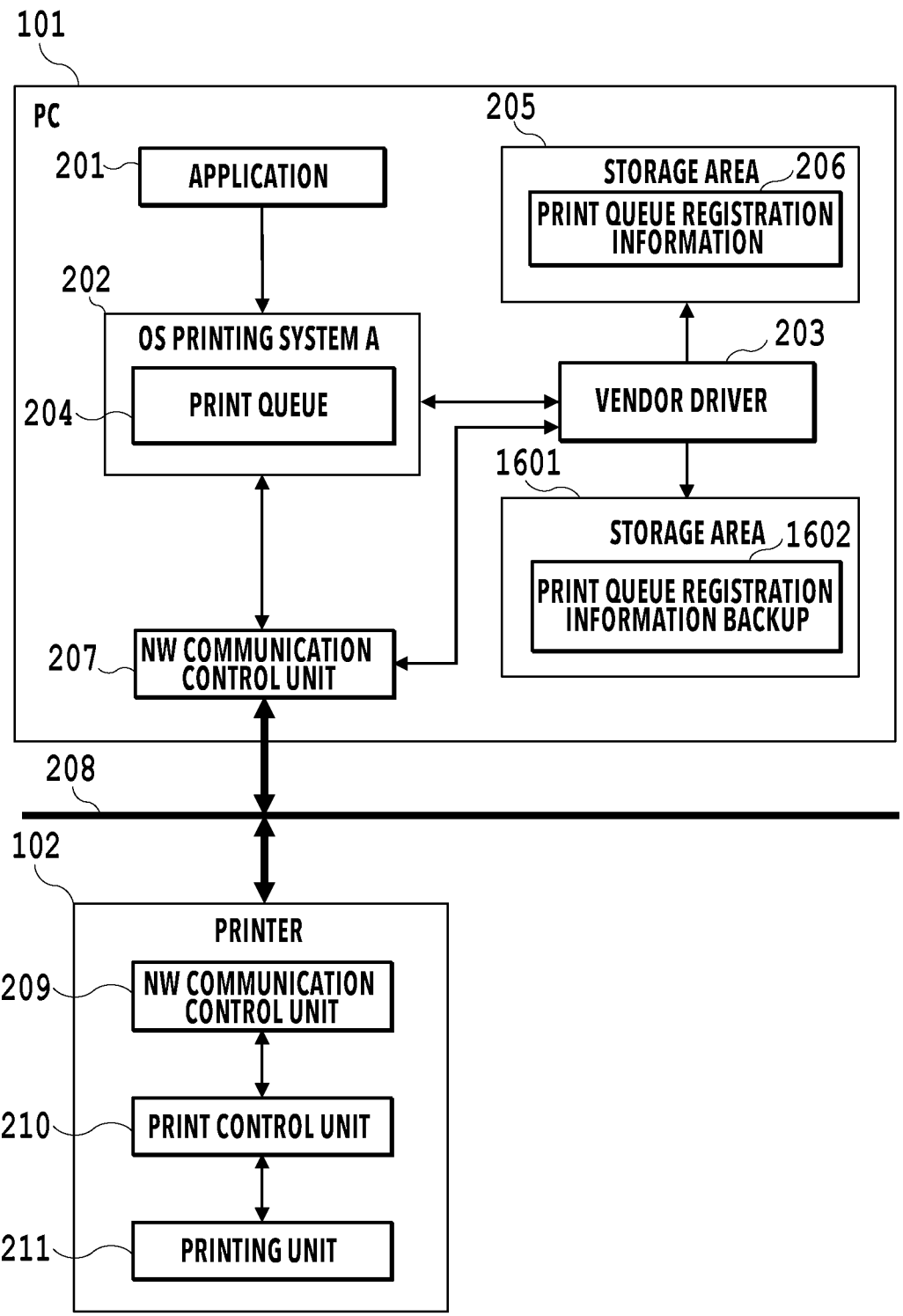
FIG. 16 is a block configuration diagram of the printing system before the OS upgrade.

FIG. 16 is a diagram showing a block configuration of the system before the OS upgrade in the present embodiment. The configuration of FIG. 16 is basically identical to the system configuration of FIG. 2 except that the vendor driver 203 stores (saves) the print queue registration information as a print queue registration information backup 1602 in a storage area 1601.

Print Queue Registration Information Save Processing

In the present embodiment, it is assumed that the print queue registration information is saved at the time of first activation after the installation or update of the vendor driver 203 or at the time of first activation after the registration of a new print queue with the vendor driver 203.

Figure 17:
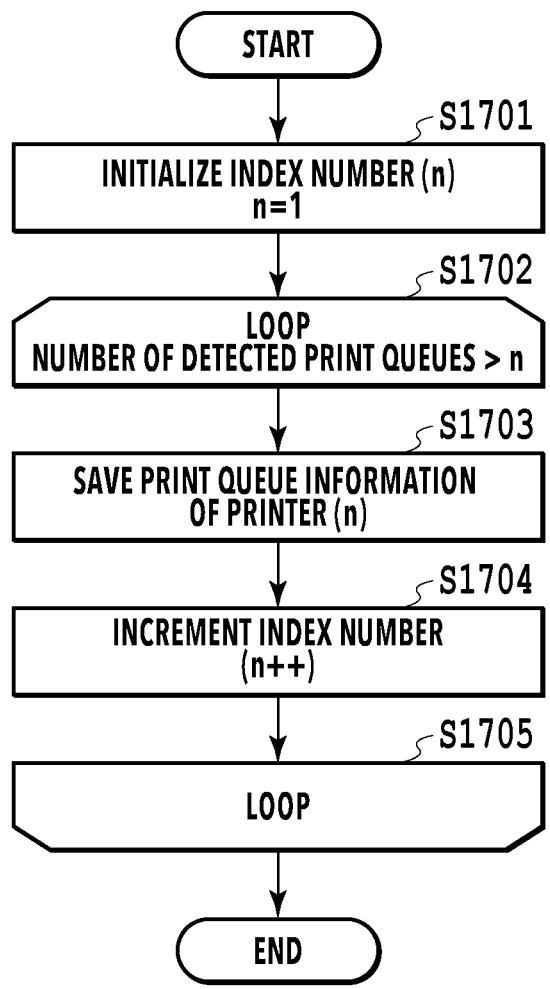
FIG. 17 is a flowchart at the first activation of a vendor driver.

FIG. 17 is a flowchart of processing at the first activation after the installation or update of the vendor driver 203 or after the registration of a new print queue with the vendor driver 203. The vendor driver 203 performs the processing of FIG. 17 at the first activation.

In S1701, the vendor driver 203 initializes an index number (n=1). In S1702, the vendor driver 203 starts a loop which is repeated a number of times equal to the number of existing print queues. In S1703, the vendor driver 203 obtains printer information from print queue registration information 206 of a vendor driver of the n-th printer and registers a print queue registration information backup 1602. The location of the storage area 1601 for the print queue registration information backup 1602 is predetermined by the vendor driver 203.

In the present embodiment, in a case where a user changes preset print setting information of the print queue registration information, the vendor driver 203 saves the information.

Figure 18:
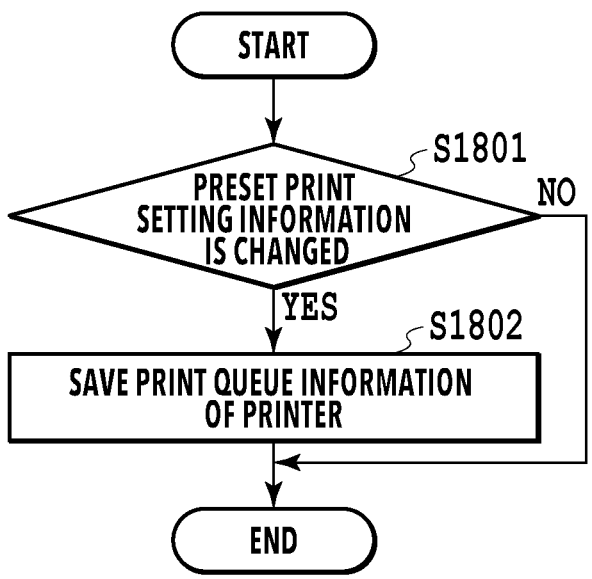
FIG. 18 is a flowchart at the time of changing preset print setting information of the vendor driver.

FIG. 18 is a flowchart of processing of saving preset print setting information by the vendor driver 203. In S1801, if the vendor driver 203 determines that a user changes preset print setting information, the vendor driver 203 proceeds to S1802. In S1802, the vendor driver 203 obtains the preset print setting information from the print queue registration information 206 and registers the print queue registration information backup 1602. If the vendor driver 203 determines in S1801 that a new print queue is not registered, the processing is finished.

Automatic Print Queue Generation Processing of Print Conversion Utility

Figure 19:
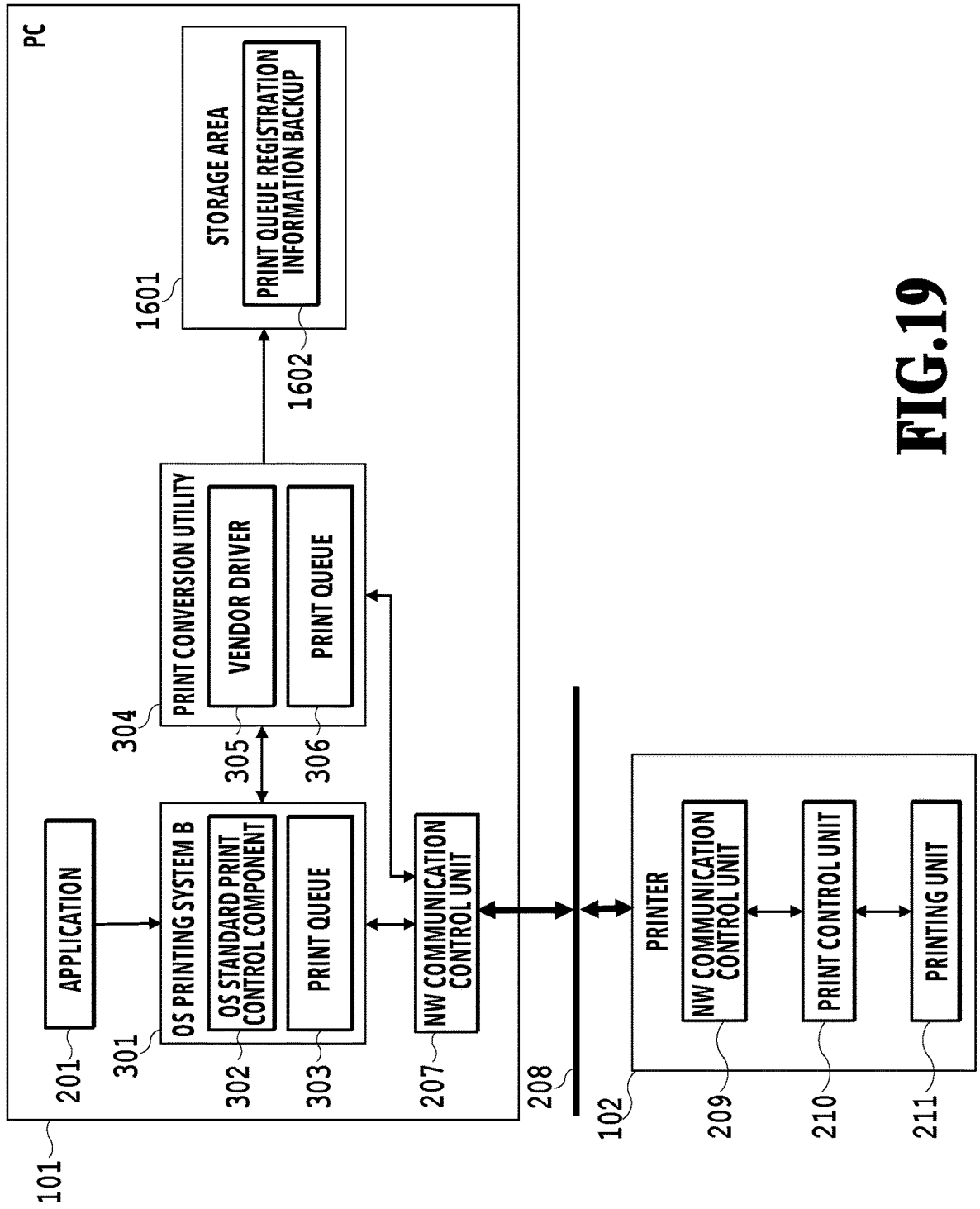
FIG. 19 is a block configuration diagram of the printing system after the OS upgrade.

FIG. 19 shows a system configuration after the OS upgrade of the PC 101. The print queue registration information backup 1602 is information recorded in the print queue registration information save processing by the vendor driver 203.

The processing at the first activation of the print conversion utility 304 is basically the same as that described in the first embodiment. More specifically, since the processing is different from that described in the first embodiment only in a storage area for which the print conversion utility 304 determines whether the print queue registration information of the vendor driver is present in S501, the description thereof is omitted.

As described above, in the present embodiment, print queue information based on which printing was executed via the vendor driver before the OS upgrade of the PC is automatically saved by the vendor driver before the OS upgrade of the PC. After the OS upgrade of the PC, the print conversion utility informs a user of the printer list. The print conversion utility allows a user to select a printer to be registered with the print conversion utility, thereby simplifying print queue registration with the print conversion utility. Further, a user can register the print queue even in a case where a printer used before the OS upgrade is not connected to the PC or does not have power applied thereto. A user can also reuse preset print settings registered with the print queue of the vendor driver.

Other Embodiments

In the third embodiment, the vendor driver 203 stores the print queue registration information backup 1602 in the storage area 1601 in the PC 101. However, the storage area is not limited to this. As described in the second embodiment, the vendor driver 203 may be configured to store the print queue registration information backup 1602 in a predetermined server.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-014841 filed Jan. 31, 2020, which is hereby incorporated by reference wherein herein in its entirety.

What is claimed is:

1. A control method using print control software operable in an information processing apparatus, the information processing apparatus being capable of communicating with a printer and capable of storing registration information on the printer in a predetermined storage area, the control method causing a computer of the information processing apparatus to execute:
    obtaining, after an operating system (OS) on the information processing apparatus is updated to a second version capable of using the print control software, the registration information on the printer stored in the predetermined storage area, and the registration information being stored during an operation of a first version of the OS on which the print control software is not used;
    displaying printer information based on the obtained registration information; and
    registering a print queue with the print control software using the obtained registration information on a basis that the displayed printer information is selected.

2. The control method according to claim 1, wherein the registration information is obtained in a case where the print control software is first activated in the information processing apparatus.

3. The control method according to claim 1, further causing the computer to execute:
    performing processing to register a print queue corresponding to the registered print queue with OS standard print software in a case where the print queue is registered with the print control software.

4. The control method according to claim 1, wherein the registration information on the print queue is stored in a second storage area of the information processing apparatus in the first version of an OS which operates on the information processing apparatus,
    the registration information on the print queue stored in the second storage area is saved in the predetermined storage area while the OS is in the first version, and
    the print control software operates in a second version later than the first version of the OS which operates on the information processing apparatus.

5. The control method according to claim 4, wherein the registration information on the print queue stored in the second storage area is saved in the predetermined storage area by save software which operates in the first version of the OS.

6. The control method according to claim 4, wherein the registration information on the print queue stored in the second storage area is saved in the predetermined storage area by a printer driver of the printer which operates in the first version of the OS.

7. The control method according to claim 1, further causing the computer to execute:
    displaying a list of printers corresponding to the registration information on the print queue; and
    accepting selection of a printer to be registered from the list,
    wherein the registration information on the print queue of the printer whose selection is accepted is registered.

8. The control method according to claim 1, wherein the print queue is registered with the print control software while power is not applied to the printer.

9. The control method according to claim 1, wherein the print queue is registered with the print control software while the information processing apparatus and the printer are not connected to each other via a network or USB.

10. The control method according to claim 1, wherein the registration information on the print queue includes preset print setting information.

11. The control method according to claim 1, wherein the registration information on the print queue includes model information on the printer and an IP address of the printer or information from which the IP address is derivable.

12. The control method according to claim 1, wherein the registration information on the print queue includes model information on the printer and a serial number of a USB device.

13. An information processing apparatus capable of communicating with a printer using print control software and capable of storing registration information on the printer in a predetermined storage area, the information processing apparatus comprising:
- a memory containing instructions;
- a processor executing the instructions to:
  - obtain, after an operating system (OS) on the information processing apparatus is updated to a second version capable of using the print control software, the registration information on the printer stored in the predetermined storage area, and the registration information being stored during an operation of a first version of the OS on which the print control software is not used;
  - display printer information based on the obtained registration information; and
  - register a print queue with print control software using the obtained registration information on a basis that the displayed printer information is selected.

14. The information processing apparatus according to claim 13, wherein the registration information is obtained in a case where the print control software is first activated in the information processing apparatus.

15. The information processing apparatus according to claim 13, wherein a print queue corresponding to the registered print queue with OS standard print software is registered in a case where the print queue is registered with the print control software.

16. The information processing apparatus according to claim 13, wherein the registration information on the print queue is stored in a second storage area of the information processing apparatus in the first version of an OS which operates on the information processing apparatus,
- the registration information on the print queue stored in the second storage area is saved in the predetermined storage area while the OS is in the first version, and
- the print control software operates in a second version later than the first version of the OS which operates on the information processing apparatus.

17. The information processing apparatus according to claim 16, wherein the registration information on the print queue stored in the second storage area is saved in the predetermined storage area by save software which operates in the first version of the OS.

18. The information processing apparatus according to claim 16, wherein the registration information on the print queue stored in the second storage area is saved in the predetermined storage area by a printer driver of the printer which operates in the first version of the OS.

19. The information processing apparatus according to claim 13, wherein the instructions are further executed to:
- display a list of printers corresponding to the registration information on the print queue obtained by the obtaining unit;
- accept selection of a printer to be registered from the list; and
- register the registration information on the print queue of the printer whose selection is accepted.

20. The information processing apparatus according to claim 13, wherein the print queue is registered with the print control software while power is not applied to the printer.

21. The information processing apparatus according to claim 13, wherein the print queue is registered with the print control software while the information processing apparatus and the printer are not connected to each other via a network or USB.

* * * * *